United States Patent
Cho et al.

(10) Patent No.: US 11,046,792 B2
(45) Date of Patent: Jun. 29, 2021

(54) METHOD OF PREPARING (METH)ACRYLONITRILE-BASED POLYMER FOR PREPARING CARBON FIBER

(71) Applicant: LG CHEM, LTD., Seoul (KR)

(72) Inventors: Jeong Hun Cho, Daejeon (KR); Young Soo Song, Daejeon (KR); Hyun Min Kim, Daejeon (KR); Chang Hun Kim, Daejeon (KR); Hyo Yong Kim, Daejeon (KR); Joon Hee Cho, Daejeon (KR)

(73) Assignee: LG CHEM, LTD., Seoul (KR)

( * ) Notice: Subject to any disclaimer, the term of this patent is extended or adjusted under 35 U.S.C. 154(b) by 252 days.

(21) Appl. No.: 16/469,030

(22) PCT Filed: Sep. 14, 2018

(86) PCT No.: PCT/KR2018/010876
§ 371 (c)(1),
(2) Date: Jun. 12, 2019

(87) PCT Pub. No.: WO2019/066342
PCT Pub. Date: Apr. 4, 2019

(65) Prior Publication Data
US 2019/0315889 A1    Oct. 17, 2019

(30) Foreign Application Priority Data

Sep. 29, 2017    (KR) .................... 10-2017-0127935
Sep. 7, 2018    (KR) .................... 10-2018-0107118

(51) Int. Cl.
| | |
|---|---|
| *C08F 2/01* | (2006.01) |
| *C08F 2/06* | (2006.01) |
| *C08F 20/44* | (2006.01) |
| *D01F 9/22* | (2006.01) |

(52) U.S. Cl.
CPC .................. *C08F 2/01* (2013.01); *C08F 2/06* (2013.01); *C08F 20/44* (2013.01); *D01F 9/22* (2013.01); *C08F 2400/02* (2013.01)

(58) Field of Classification Search
CPC .... C08F 220/44; C08F 220/14; C08F 222/02; C08F 2/01; C08F 2/06; C08F 20/44; C08F 2400/02; D01F 9/22
USPC ........................................................ 526/341
See application file for complete search history.

(56) References Cited

U.S. PATENT DOCUMENTS

| | | | |
|---|---|---|---|
| 3,479,312 A | 11/1969 | Saburo et al. | |
| 4,540,754 A | 9/1985 | Kobashi et al. | |
| 4,902,762 A | 2/1990 | Imai et al. | |
| 5,728,793 A * | 3/1998 | Kumagai | C08F 2/02 526/329.7 |
| 2003/0158374 A1 | 8/2003 | Kono et al. | |
| 2010/0003515 A1 | 1/2010 | Tanaka et al. | |
| 2015/0158963 A1 | 6/2015 | Ozawa et al. | |
| 2016/0145772 A1 | 5/2016 | Yoon et al. | |
| 2017/0275452 A1 | 9/2017 | Seo et al. | |

FOREIGN PATENT DOCUMENTS

| | | | |
|---|---|---|---|
| CN | 1820033 A | | 8/2006 |
| CN | 101343337 A | | 1/2009 |
| CN | 101553511 A | | 10/2009 |
| CN | 104558394 A | | 4/2015 |
| CN | 104710565 B | | 1/2017 |
| JP | 59191704 A | | 10/1984 |
| JP | S64-52811 A | | 2/1989 |
| JP | 08143609 A | | 6/1996 |
| JP | 1161068 A | | 3/1999 |
| JP | 2003-064108 A | | 3/2003 |
| JP | 2007182645 A | | 7/2007 |
| JP | 2012-201739 A | | 10/2012 |
| JP | 2013-237746 A | | 11/2013 |
| JP | 2014-201728 A | | 10/2014 |
| JP | 2015-048378 A | | 3/2015 |
| JP | 2016540131 A | | 12/2016 |
| KR | 10-1986-0000807 B1 | | 6/1986 |
| KR | 10-2003-0062247 A | | 7/2003 |
| KR | 10-2010-0113813 A | | 10/2010 |
| KR | 10-1037115 B1 | | 5/2011 |
| KR | 10-2014-0013174 A | | 2/2014 |
| WO | 2014002503 A1 | | 1/2014 |

OTHER PUBLICATIONS

Office Action of Japanese Patent Office in Appl'n No. 2019-549424, dated Aug. 18, 2020.

* cited by examiner

*Primary Examiner* — William K Cheung
(74) *Attorney, Agent, or Firm* — Dentons US LLP

(57) ABSTRACT

The present invention relates to a method of preparing a (meth)acrylonitrile-based polymer for preparing a carbon fiber, which comprises adding a reaction solution comprising a (meth)acrylonitrile-based monomer and a reaction solvent to a reactor to perform solution polymerization, performing solution polymerization under a condition in which a power consumption of the reactor is 1 to 5 kW/m$^3$ when the reaction solution in the reactor has a viscosity of 0.1 poise or more and 250 poise or less, and performing solution polymerization under a condition in which a power consumption of the reactor is 8 to 13 kW/m$^3$ when the reaction solution in the reactor has a viscosity of more than 250 poise and 450 poise or less.

10 Claims, No Drawings

METHOD OF PREPARING (METH)ACRYLONITRILE-BASED POLYMER FOR PREPARING CARBON FIBER

CROSS-REFERENCE TO RELATED APPLICATIONS

This application is a National Stage Application of International Application No. PCT/KR2018/010876, filed on Sep. 14, 2018, which claims priority to and the benefit of Korean Patent Application No. 10-2017-0127935, filed on Sep. 29, 2017, and Korean Patent Application No. 10-2018-0107118, filed on Sep. 7, 2018, the disclosures of which are incorporated herein by reference in their entirety.

TECHNICAL FIELD

The present invention relates to a method of preparing a (meth)acrylonitrile-based polymer for preparing a carbon fiber, and more particularly, to a method of preparing a (meth)acrylonitrile-based polymer for preparing a carbon fiber, which regulates power consumption according to the viscosity of a reaction solution in a reactor in solution polymerization.

BACKGROUND ART

A carbon fiber is a fibrous carbon material that consists of 90 wt % or more of the carbon element with respect to the total weight, and refers to a fiber obtained by thermal decomposition of a fiber-type precursor prepared from an (meth)acrylonitrile-based polymer or a petroleum or char-coal-based hydrocarbon residue such as pitch or rayon in an inert atmosphere.

A carbon fiber is a fiber-type material which has a structure and tissue characteristic of carbon which is a component, has excellent characteristics such as thermal resistance, chemical stability, electrothermal conductivity, dimension stability due to low thermal expansion, a low density, a friction wear characteristic, X-ray permeability, electromagnetic wave shielding, biocompatibility and flexibility, and can impart a very excellent adsorption property according to activation conditions.

Meanwhile, a (meth)acrylonitrile-based polymer has been widely used as a raw material for a carbon fiber precursor. As a method of preparing a (meth)acrylonitrile-based polymer, solution polymerization is mainly used. The solution polymerization is a method using a monomer, an initiator and a reaction solvent, and can use a polymer solution itself as a spinning solution, and therefore this method has an advantage of unnecessity of a process of dissolving a polymer in a spinning solvent.

Solution polymerization is performed by smoothly mixing a reaction solution in a reactor using a stirrer. However, when the stirrer constantly consumes power in solution polymerization, as a polymerization conversion ratio is increased, the reaction solution which is changed to a high viscosity cannot be smoothly mixed such that there may be variations in physical properties of an obtained polymer. In addition, when the power consumption of the stirrer is based on a high-viscosity reaction solution, production costs may be increased due to unnecessary energy consumption.

Disclosure

Technical Problem

An object of the present invention is to provide a method of preparing a (meth)acrylonitrile-based polymer for preparing a carbon fiber, which can smoothly perform mixing of a reaction solution in a reactor in solution polymerization and minimize energy consumption.

Technical Solution

To attain the above-mentioned object, the present invention provides a method of preparing a (meth)acrylonitrile-based polymer for preparing a carbon fiber, which comprises: adding a reaction solution comprising a (meth)acrylonitrile-based monomer and a reaction solvent to a reactor to perform solution polymerization; performing solution polymerization under a condition in which a power consumption of the reactor is 1 to 5 kW/m$^3$ when the reaction solution in the reactor has a viscosity of 0.1 poise or more and 250 poise or less; and performing solution polymerization under a condition in which a power consumption of the reactor is 8 to 13 kW/m$^3$ when the reaction solution in the reactor has a viscosity of more than 250 poise and 450 poise or less.

Advantageous Effects

According to a method of preparing a (meth)acrylonitrile-based polymer for preparing a carbon fiber of the present invention, solution polymerization can be performed while reducing energy consumption and smoothly mixing a reaction solution in a reactor. In addition, physical properties of the obtained (meth)acrylonitrile-based polymer can be constantly maintained, and the final polymerization conversion ratio can be also increased.

Modes of the Invention

Hereinafter, the present invention will be described in further detail to help in understanding of the present invention.

Terms or words used in the specification and claims should not be interpreted as limited to ordinary or dictionary meanings, but interpreted as meanings and concepts corresponding to the technical idea of the present invention based on the principle in that the inventors can suitably define the concepts of these terms to explain the invention in the best way.

In the present invention, a viscosity may be measured using a DV2T viscometer (Trade Name, Manufacturer: Brookfield).

Specifically, 0.5 mL of a reaction solution was taken and dropped in the center of a sample cup to avoid foaming or trapping around a cone spindle (CPA-52Z). Subsequently, the temperature is set to 45° C., and then allowed to stabilize. Afterward, to increase the accuracy of a measured value, a viscosity may be measured by regulating a rotation speed of spindles to have a torque value of 50% or more. A measurement time may be 1 to 2 minutes for the viscosity to reach a stable value.

A method of preparing a (meth)acrylonitrile-based polymer for preparing a carbon fiber according to an exemplary embodiment of the present invention comprises adding a reaction solution including a (meth)acrylonitrile-based monomer and a reaction solvent to a reactor to perform solution polymerization. When a viscosity of the reaction solution in the reactor is 0.1 poise or more and 250 poise or less, the solution polymerization is performed under a condition in which a power consumption of the reactor is 1 to 5 kW/m$^3$, and when a viscosity of the reaction solution in the reactor is more than 250 poise to 450 poise or less, the solution polymerization is performed under a condition in which a power consumption of the reactor is 8 to 13 kW/m$^3$.

The (meth)acrylonitrile-based monomer may be one or more selected from the group consisting of acrylonitrile and methacrylonitrile, and preferably acrylonitrile.

The reaction solvent may be one or more selected from the group consisting of dimethyl sulfoxide, dimethylformamide and dimethylacetamide, and preferably dimethyl sulfoxide.

The reaction solution may include the reaction solvent at 250 to 500 parts by weight, preferably, 300 to 450 parts by weight, more preferably, 350 to 400 parts by weight, with respect to 100 parts by weight of the (meth)acrylonitrile monomer or a monomer mixture including the same.

When the above-described range is satisfied, the solution polymerization may be performed by easily mixing the reaction solution with a suitable viscosity. In addition, since a local exothermic reaction does not occur in the solution polymerization, the heat of reaction can be easily controlled. In addition, as a polymerization rate is suitably maintained, polymerization productivity may also be excellent.

Meanwhile, the reaction solution may further include an additional monomer as a comonomer, in addition to a (meth)acrylonitrile monomer. The comonomer may be, for example, one or more selected from a carboxylic acid-based monomer and a (meth)acrylate-based monomer. The carboxylic acid-based monomer may be one or more selected from the group consisting of acrylic acid, methacrylic acid, ethacrylic acid, itaconic acid, crotonic acid, citraconic acid, maleic acid and mesaconic acid, and preferably itaconic acid. The (meth)acrylate-based monomer may be one or more selected from the group consisting of methyl acrylate, ethyl acrylate, propyl acrylate, methyl methacrylate, ethyl methacrylate and propyl methacrylate, and preferably methyl acrylate.

The comonomer may be included at 10 parts by weight or less, preferably, 0.1 to 10 parts by weight, more preferably, 1 to 7 parts by weight, and even more preferably, 1 to 5 parts by weight, with respect to 100 parts by weight of the (meth)acrylonitrile-based monomer. When the above-mentioned range is satisfied, in a process of producing a polyacrylonitrile-based fiber, since it is possible to not only reduce an oxidation stabilization reaction-initiating temperature but also prevent a local exothermic phenomenon, damage to the polyacrylonitrile-based fiber during the oxidation stabilization reaction may be prevented. In addition, the comonomer may impart suitable stretchability to the polyacrylonitrile-based fiber.

The solution polymerization may be performed when a temperature of the reaction solution is 60 to 80° C., and preferably, the solution polymerization may be initiated and performed by raising a temperature of the reaction solution to 60 to 70° C. and adding an initiator. In addition, at the point of time when a polymerization conversion ratio is 50% or more, the temperature is increased to 70 to 80° C., and then polymerization may be continued. As described above, when the temperature is increased at the point of time when the polymerization conversion ratio is 50% or more, the solution polymerization may be performed while the reaction solution is sufficiently mixed due to a low viscosity of the reaction solution.

The initiator serves to initiate a polymerization reaction between monomers in a reaction solution, and may be, for example, azobisisobutyronitrile, (azobis(4-methoxy-2,4-dimethylvaleronitrile), azobis(2,4-dimethylvaleronitrile), dimethyl azobis(2-methylpropionate), azobis(2-methylbutyro-2-tolyl), azobis(cyclohexane-1-carbonitrile), or azobis[N-(2-prophenyl)-2-methyl propionamide], and most preferably, azobisisobutyronitrile.

The initiator may be added at 0.1 to 2 parts by weight, preferably, 0.2 to 1.5 parts by weight, and more preferably, 0.4 to 1 part by weight, with respect to 100 parts by weight of the (meth)acrylonitrile monomer or a monomer mixture including the same. When the above-described range is satisfied, exothermic control is possible, and the final polymerization conversion ratio may not be reduced.

The reactor may be a batch-type reactor, and may be equipped with a stirrer for mixing the reaction solution, a thermometer for measuring an inner temperature of the reactor, a condenser and a jacket for controlling the heat of reaction generated in the reaction. The stirrer may be a paddle-type, pitched paddle-type, a turbine-type, a Bluemagine-type, a Pfaudler-type, an anchor-type, or a double-helical ribbon-type stirrer, and preferably a double-helical ribbon-type stirrer.

The power consumption of the reactor may be the power consumption of the stirrer in the reactor needed to mix a reaction solution.

A viscosity of the reaction solution in the reactor may refer to a viscosity at a solution polymerization temperature of 60 to 80° C., and preferably, 65 to 75° C.

When the viscosity of the reaction solution in the reactor is 0.1 poise or more and 250 poise or less, solution polymerization may be performed under a condition in which the power consumption of the reactor is 2 to 4 kW/m$^3$. When the viscosity of the reaction solution in the reactor is more than 250 poise and 450 poise or less, solution polymerization may be performed under a condition in which the power consumption of the reactor is 9 to 11 kW/m$^3$.

When the above-described power consumption is satisfied, it is possible to minimize energy consumption while sufficiently mixing the reaction solution. In addition, an amount of the unreacted monomer is decreased due to sufficient mixing of the reaction solution, the final polymerization conversion ratio may be increased, and the physical properties of the obtained polymer may be constantly maintained.

When the power consumption is less than the above-described ranges, the reaction solution may not be sufficiently mixed such that the solution polymerization may not be properly performed, resulting in a low final polymerization conversion ratio and large variations in physical properties of the obtained polymer. When the power consumption exceeds the above-mentioned ranges, energy may be excessively consumed, and thus process efficiency may be reduced.

EXAMPLES

Hereinafter, embodiments of the present invention will be described in detail so that those skilled in the art can easily carry out the present invention. However, the present invention may be embodied in a variety of different forms, and is not limited to examples to be described below.

<Method of Preparing Acrylonitrile-Based Polymer>

Example 1

A reaction solution was prepared by uniformly dissolving 100 parts by weight of a monomer mixture in which acrylonitrile, methyl acrylate and itaconic acid were mixed at a molar ratio of 97:2:1 in 370 parts by weight of dimethyl sulfoxide.

The reaction solution was added to a reactor equipped with a stirrer, and subjected to nitrogen substitution. The inner temperature of the reactor was increased to 70° C., 0.6 part by weight of azobisisobutyronitrile was added as a radical polymerization initiator to initiate polymerization. When the viscosity of the reaction solution in the reactor was 0.1 poise or more and 250 poise or less, solution polymerization was performed under a condition in which the average power consumption of the reactor was 2.5 kW/m$^3$, and when the viscosity of the reaction solution in the reactor was more than 250 poise and 450 poise or less, solution polymerization was performed under a condition in which the average power consumption of the reactor was 11 kW/m$^3$, thereby obtaining an acrylonitrile-based polymer. Total time for solution polymerization was 14 hours.

Example 2

An acrylonitrile-based polymer was prepared by the same method as described in Example 1, except that solution polymerization was performed under a condition in which the average power consumption of the reactor was 8 kW/m$^3$ when the viscosity of the reaction solution in the reactor was more than 250 poise and 450 poise or less.

Example 3

An acrylonitrile-based polymer was prepared by the same method as described in Example 1, except that solution polymerization was performed under a condition in which the average power consumption of the reactor was 13 kW/m$^3$ when the viscosity of the reaction solution in the reactor was more than 250 poise and 450 poise or less.

Example 4

An acrylonitrile-based polymer was prepared by the same method as described in Example 1, except that solution polymerization was performed under a condition in which the average power consumption of the reactor was 1 kW/m$^3$ when the viscosity of the reaction solution in the reactor was 0.1 poise or more and 250 poise or less.

Example 5

An acrylonitrile-based polymer was prepared by the same method as described in Example 1, except that solution polymerization was performed under a condition in which the average power consumption of the reactor was 5 kW/m$^3$ when the viscosity of the reaction solution in the reactor was 0.1 poise or more and 250 poise or less.

Comparative Example 1

An acrylonitrile-based polymer was prepared by the same method as described in Example 1, except that solution polymerization was performed under a condition in which the average power consumption of the reactor was 7 kW/m$^3$ when the viscosity of the reaction solution in the reactor was more than 250 poise and 450 poise or less.

Comparative Example 2

An acrylonitrile-based polymer was prepared by the same method as described in Example 1, except that solution polymerization was performed under a condition in which the average power consumption of the reactor was 0.4 kW/m$^3$ when the viscosity of the reaction solution in the reactor was 0.1 poise or more and 250 poise or less, and solution polymerization was performed under a condition in which the average power consumption of the reactor was 7 kW/m$^3$ when the viscosity of the reaction solution in the reactor was more than 250 poise and 450 poise or less.

Comparative Example 3

An acrylonitrile-based polymer was prepared by the same method as described in Example 1, except that solution polymerization was performed under a condition in which the average power consumption of the reactor was 3 kW/m$^3$ when the viscosity of the reaction solution in the reactor was 0.1 poise or more and 250 poise or less, and solution polymerization was performed under a condition in which the average power consumption of the reactor was 5 kW/m$^3$ when the viscosity of the reaction solution in the reactor was more than 250 poise and 450 poise or less.

Comparative Example 4

An acrylonitrile-based polymer was prepared by the same method as described in Example 1, except that solution polymerization was performed under a condition in which the average power consumption of the reactor was 11 kW/m$^3$ when the viscosity of the reaction solution in the reactor was 0.1 poise or more and 250 poise or less, and solution polymerization was performed under a condition in which the average power consumption of the reactor was 11 kW/m$^3$ when the viscosity of the reaction solution in the reactor was more than 250 poise and 450 poise or less.

Experimental Example 1

A polymerization conversion ratio and a polydispersity index (Mw/Mn) of each of the acrylonitrile-based polymers of Example 1, and Comparative Examples 1 and 2 were measured, and the results are listed in Table 1 below.

1) Polydispersity index: A weight average molecular weight (Mw) and a number average molecular weight (Mn) of 1 g of the obtained polymer solution were measured by gel permeation chromatography (GPC) under the following conditions, and a polydispersity index was calculated.

Column: PL mixed B×2, Solvent: DMF/0.05 M LiBr (0.45 μm filtered), Flow rate: 1.0 mL/min, Sample concentration: 4.0 mg/mL, Injection amount: 100 μL, Column temperature: 65° C., Detector: Waters RI Detector, Standard: PMMA 2) Final polymerization conversion ratio: 1 g of the obtained polymer solution was precipitated in water, washed with warm water, and dried at 70° C. for 4 hours. A weight of the dry resin was measured to measure a content of the solid, and the polymerization conversion ratio was measured by the following formula.

Polymerization conversion ratio (%)=(Measured content of solid)/(content of solid per gram of reaction solution calculated by ratio of solid and solvent added to reactor)×100

TABLE 1

| Classification | Polymerization conversion ratio (%) | Polydispersity index (Mw/Mn) |
| --- | --- | --- |
| Example 1 | 94 | 2.2 |
| Example 2 | 93 | 2.2 |

TABLE 1-continued

| Classification | Polymerization conversion ratio (%) | Polydispersity index (Mw/Mn) |
|---|---|---|
| Example 3 | 94 | 2.3 |
| Example 4 | 93 | 2.2 |
| Example 5 | 94 | 2.3 |
| Comparative Example 1 | 87 | 2.8 |
| Comparative Example 2 | 90 | 2.5 |
| Comparative Example 3 | 86 | 2.8 |
| Comparative Example 4 | 92 | 2.2 |

Referring to Table 1, in the methods of preparing an acrylonitrile-based polymer of Examples 1 to 5 according to exemplary embodiments of the present invention, it can be seen that, since the final polymerization conversion ratio was increased, process efficiency was excellent. In addition, it was expected that, since the polydispersity index of the acrylonitrile-based polymer was also high, the mechanical properties of the carbon fiber prepared by these polymers was excellent. However, according to the methods of preparing an acrylonitrile-based polymer according to Comparative Examples 1 to 3, since the power consumption of the reactor in a high viscosity range was low, the reaction solutions of Comparative Examples 1 to 3 were not smoothly mixed, compared with those of Examples 1 to 5. Therefore, compared with Examples 1 to 5, in Comparative Examples 1 to 3, acrylonitrile-based polymers having a low final polymerization conversion ratio and a high polydispersity index were obtained.

According to the method of preparing an acrylonitrile-based polymer of Comparative Example 4, the power consumption of the reactor in a low viscosity range was excessively high, and therefore it can be estimated that excessive energy was consumed, compared with Examples 1 to 5.

The invention claimed is:

1. A method of preparing a (meth)acrylonitrile-based polymer for preparing a carbon fiber, comprising:
adding a reaction solution comprising a (meth)acrylonitrile-based monomer and a reaction solvent to a reactor to perform solution polymerization;
performing solution polymerization under a condition in which a power consumption of the reactor is 1 to 5 kW/m$^3$ when the reaction solution in the reactor has a viscosity of 0.1 poise or more and 250 poise or less; and
performing solution polymerization under a condition in which a power consumption of the reactor is 8 to 13 kW/m$^3$ when the reaction solution in the reactor has a viscosity of more than 250 poise and 450 poise or less.

2. The method of claim 1, wherein the solution polymerization is performed under a condition in which the power consumption of the reactor is 2 to 4 kW/m$^3$, when the viscosity of the reaction solution in the reactor is 0.1 poise or more and 250 poise or less.

3. The method of claim 1, wherein the solution polymerization is performed under a condition in which the power consumption of the reactor is 9 to 11 kW/m$^3$, when the viscosity of the reaction solution in the reactor is more than 250 poise and 450 poise or less.

4. The method of claim 1, wherein the solution polymerization is performed at 60 to 80° C.

5. The method of claim 1, wherein the solution polymerization is performed at 65 to 75° C.

6. The method of claim 1, wherein the power consumption of the reactor is a power consumption of a stirrer in the reactor.

7. The method of claim 1, wherein the reactor is a batch-type reactor.

8. The method of claim 1, wherein the reaction solvent is included in an amount of 250 to 500 parts by weight with respect to 100 parts by weight of the (meth)acrylonitrile-based monomer.

9. The method of claim 1, wherein the reaction solution further includes one or more comonomers selected from the group consisting of a (meth)acrylate-based monomer and a carboxylic acid-based monomer.

10. The method of claim 9, wherein the one or more comonomers are included in an amount of 0.1 to 10 parts by weight with respect to 100 parts by weight of the (meth)acrylonitrile-based monomer.

* * * * *